July 11, 1939.   E. W. DART   2,165,458
SPAR CHORD
Filed Nov. 14, 1938   2 Sheets-Sheet 1
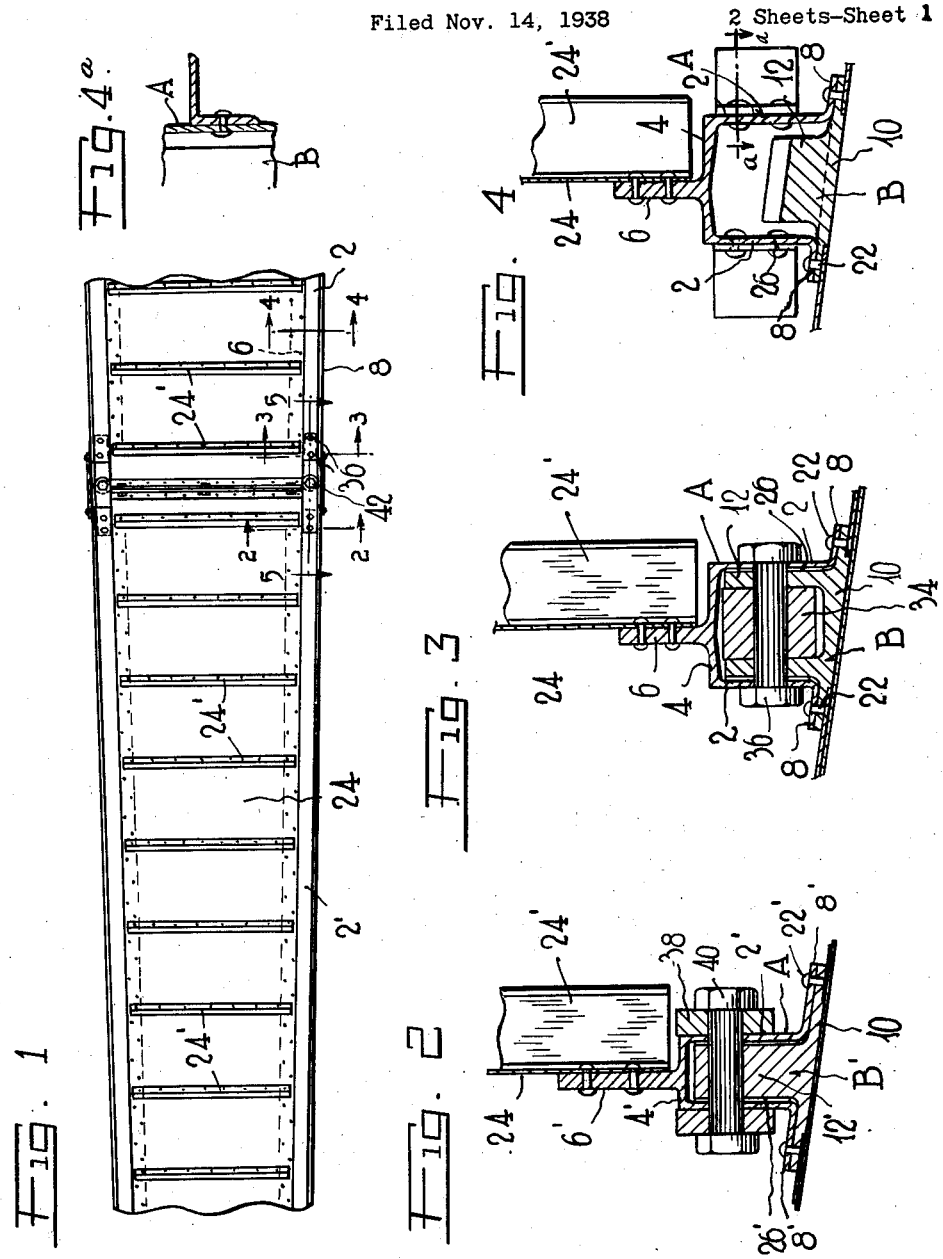
INVENTOR.
EDWARD W. DART
ATTORNEY

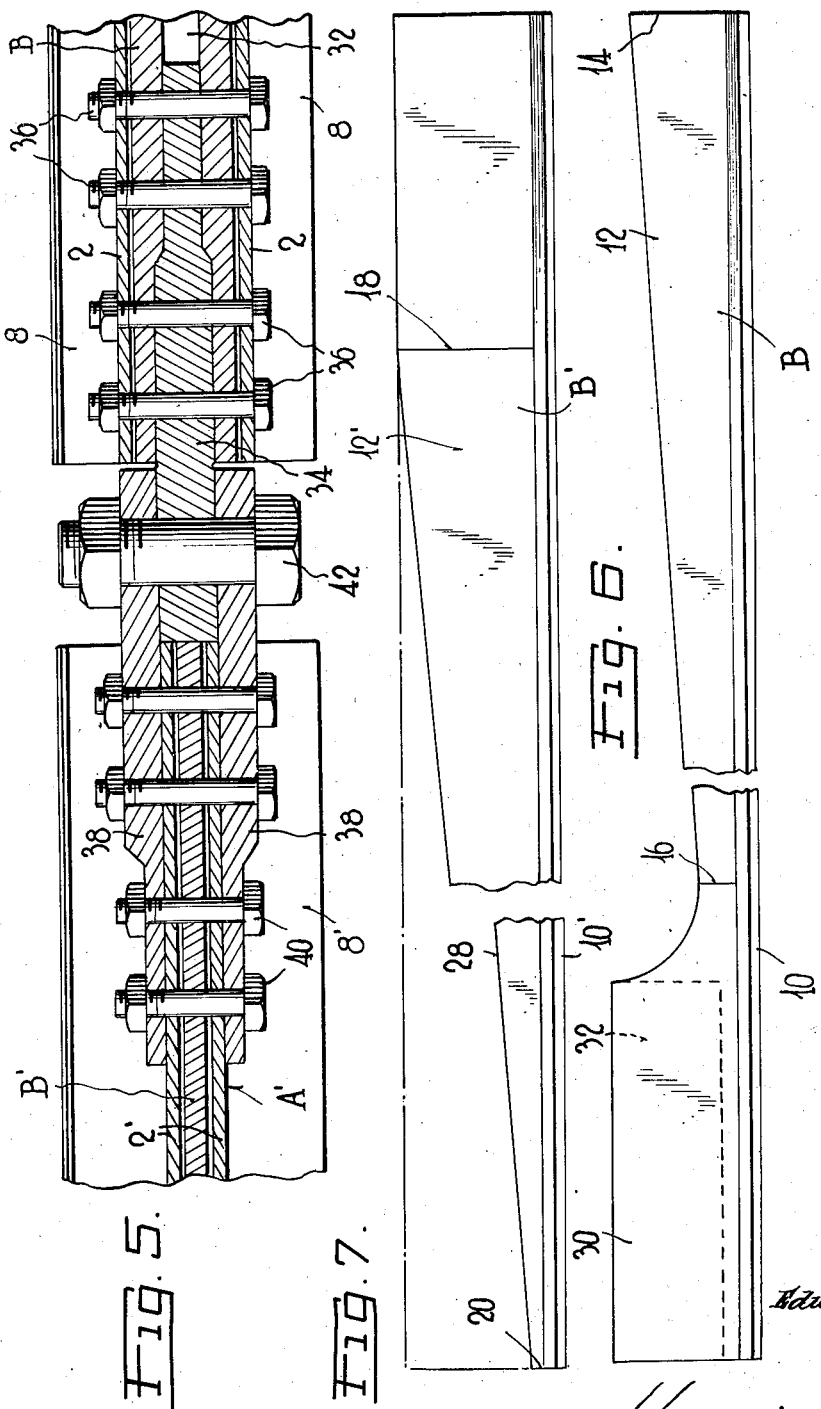

UNITED STATES PATENT OFFICE 2,165,458

SPAR CHORD

Edward W. Dart, Lutherville, Md., assignor to The Glenn L. Martin Company, Baltimore, Md.

Application November 14, 1938, Serial No. 240,369

10 Claims. (Cl. 189—37)

The invention relates to beams, and particularly to an aircraft wing construction embodying a novel spar chord design.

In some fields, and particularly in the wings of aircraft, the required strength of a beam decreases along its length. For example, at the tip of the wing of an aircraft, the beam is under no load and thus may be relatively small, whereas near the inner end of the wing the beam must carry a large load. Of course in an aircraft weight is very important, and therefore the beam must be formed so that its strength does not greatly exceed that which is necessary for the loads to be sustained. In the past the practice has been in aircraft to use a beam of decreasing dimensions toward the tip of the wing. Such beams have ordinarily been formed by the extrusion of a metal element, of constant cross section throughout, which is then milled down as desired to the necessary dimensions. The cross section of the beam is often somewhat irregular because flanges must be provided for the attachment of ribs, spar webs, skin surfaces and the like. The machining of such spar chord or beam to reduce its cross section requires several milling operations.

The primary object of the present invention is to provide a spar chord structure which can be reduced in strength and therefore in weight along its length by a single milling operation, or by a single cut in one plane.

A purpose of the invention is to provide a spar chord of this type which is of very simple structure, and which can be made from extruded metal parts.

Still another object is to provide a beam of this nature which is well adapted for the attachment thereto of various fittings such as are required particularly in airplane wings.

Another feature of the invention resides in the provision, particularly in conjunction with a spar chord of the type described herein, of a novel hinge fitting for connecting two beams, as for instance the spars of the inner and outer sections of the wing of an aircraft.

An advantage of this novel fitting is that it renders it possible to obtain long spar chords within the limits imposed by the size of normal ingots from which the beams may be extruded, while making it unnecessary to splice or attach two sections together by riveting attachments through their full thickness.

Further objects and advantages of the invention will appear more fully from the following description, particularly when taken in conjunction with the accompanying drawings which form a part thereof.

In the drawings:

Fig. 1 shows in side elevation a spar of an airplane wing embodying my invention;

Figs. 2, 3, 4 and 5 are cross sections on the lines 2—2, 3—3, 4—4, and 5—5 respectively of Fig. 1;

Fig. 4a is a cross section on the line 4a—4a of Fig. 4;

Fig. 6 shows in side elevation the cap member of a spar chord embodying the invention, for use with an inner wing section;

Fig. 7 is a similar view of the cap member for use with an outer wing section.

The beam made according to the invention comprises two sections one capable of fitting partially within the other. Both of these sections can be formed by the extrusion of a suitable metal through a die. The outer section indicated generally at A for the inner wing section is of a hat shape, and includes two parallel spaced walls 2, connected by a transverse portion 4 from which is upstanding a rib 6. At the lower ends of the parallel portions 2 are outwardly turned flanges 8.

The inner member, in the shape of a cap, includes a flat portion 10 of substantially the same width as the space between the outer edges of the flanges 8, and a thicker portion 12 extending at an angle thereto. The thickness of the portion 12 is such that this portion may fit between the two parallel portions 2 of the hat shaped member.

In order to reduce the weight and simultaneously the strength of such a beam, before the beam is assembled the portion 12 may be reduced in height, that is, in its direction angular to the cross piece or base 10. As shown in Fig. 6, for example, the portion 12 of the inner member B decreases from its inner end 14 to a point 16 adjacent its outer end. This beam is intended for an inner wing section.

The two sections A and B are secured together by the rivets 22 which also connect skin or other metal parts to the spar chord. The spar web 24 and spar stiffeners 24' are connected to the flange 6.

It will be noted that in the form of the invention shown in the drawings there is a slight space 26 on each side of the portion 12, or, in other words, the thickness of portion 12 is somewhat less than the distance between the parallel walls 2. The purpose of this is to permit the portion 12 to enter the space between the walls 2, even though some slight inaccuracies in the extrusion of the parts may occur. Furthermore, this space permits the presence of rivet heads which may be utilized to secure clips or other parts to the walls 2.

The outer wing section of the beam is in general similar, and corresponding parts are given corresponding reference characters with prime indicia. Fig. 7 shows the inner or cap portion B' of the outer wing beam. In this, the portion 12' decreases from a point 18 near its point of attachment to the inner wing section to the outer end 20. This type of section is intended for an outer wing section.

It will be evident that by the extrusion of a beam section such as shown in Fig. 7 in dotted lines, and then by cutting off along the straight line 28, the inner member B' may be given its proper shape with a single straight cut, and when combined with the outer member A' will compose a beam of gradually decreasing strength and weight. The same thing can be accomplished for the beam portion B of Fig. 6, except that the outer end is left solid for the purpose of connecting the hinge joint to be described below.

The hinge joint is used to provide a connection between the spar chords of the inner and outer parts of a wing by means of a single pin. It is shown in detail in cross section in Fig. 5. The inner member B as shown in Fig. 6 is provided at its outer end with an enlarged head 30. Within this head is cut a slot 32, into which fits a link member 34. The link member is secured in position by bolts 36 passing through the inner and outer members A and B and through the link.

Secured to the outside of the hat-shaped member A' of the outer wing section are two parallel links 38, which are secured to the spar chord by bolts 40 extending therethrough.

The free ends of links 38 overlap the free end of link 34, and the three are secured together by a bolt 42.

It will be evident that this provides a simple hinge pin fitting which makes it possible to secure together two spar chords without difficulty, and without splicing. Furthermore, the connection is simple and effective.

While I have described herein one embodiment of my invention, I wish it to be understood that I do not intend to limit myself thereby except within the scope of the appended claims.

I claim:

1. A chord member comprising a first longitudinally extending member, and a second longitudinally extending member secured thereto and having a portion thereof varying progressively in area longitudinally of the chord member, said chord member having the same outer outline section throughout its length.

2. A chord member comprising a first longitudinally extending member, and a second longitudinally extending member secured thereto and having a portion thereof extending within the first member, said portion varying progressively in area longitudinally of the chord member, said chord member having the same outer outline section throughout its length.

3. A beam comprising a first longitudinally extending portion having a longitudinally extending space therein, a second longitudinally extending member having a longitudinally extending portion extending within such space, such inwardly extending portion varying progressively in one dimension longitudinally of the beam, and means securing such members together.

4. A beam comprising a first longitudinally extending portion having a longitudinally extending space therein, a second longitudinally extending member having a longitudinally extending portion extending within such space, such inwardly extending portion varying progressively in one dimension longitudinally of the beam, said members having flanges thereon, and means securing such flanges together.

5. A beam comprising a first longitudinally extending member having two connected walls forming a space therebetween, and a second longitudinally extending member secured thereto having a portion extending within said space, the projection of said portion into said space decreasing longitudinally of the beam.

6. A beam comprising a first longitudinally extending member having two walls forming a space therebetween and a portion connecting said walls, flanges at the free ends of said walls, and a second longitudinally extending member having a portion adjacent said flanges and secured thereto and a second portion extending within said space, the area of said second portion decreasing longitudinally of the beam.

7. A beam comprising a first longitudinally extending member having two substantially parallel walls forming a space therebetween and a portion connecting said walls, outwardly turned flanges at the free ends of said walls, and a second longitudinally extending member having a portion adjacent said flanges and secured thereto and a second portion extending within said space at an angle to the first portion, the projection of said second portion into said space decreasing longitudinally of the beam.

8. In a beam as claimed in claim 6, said connecting portion having a flange thereon for the connection thereto of airplane parts.

9. In an airplane wing, inner and outer spar chords each composed of a first longitudinally extending member having a space therein and a second longitudinally extending member having a portion extending within the said space, such portion decreasing in cross section outwardly of the wing, and means to connect said spar chords together comprising an element extending within the inwardly extending portion of one of the spar chords and secured thereto, and elements on the outer member of the other spar chord and secured thereto, said second elements overlapping said first element and being secured thereto.

10. A spar for aircraft wings comprising two spar chords each composed of a first longitudinally extending member of equal cross section throughout and having a longitudinally extending space therein and a second longitudinally extending member secured thereto having a portion extending into such space and of decreasing cross section longitudinally of the wing, and a web connecting said spar chords.

EDWARD W. DART.